(12) United States Patent
Bodavula

(10) Patent No.: US 8,984,599 B2
(45) Date of Patent: Mar. 17, 2015

(54) REAL TIME PASSWORD GENERATION APPARATUS AND METHOD

(75) Inventor: Vikram Bodavula, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 239 days.

(21) Appl. No.: 13/359,996

(22) Filed: Jan. 27, 2012

(65) Prior Publication Data

US 2012/0198530 A1    Aug. 2, 2012

(30) Foreign Application Priority Data

Jan. 27, 2011  (IN) .............................. 252/CHE/2011

(51) Int. Cl.
*G06F 21/36* (2013.01)
*G06F 21/31* (2013.01)
*G06F 21/46* (2013.01)
*G06F 21/60* (2013.01)

(52) U.S. Cl.
CPC ................ *G06F 21/31* (2013.01); *G06F 21/46* (2013.01); *G06F 21/606* (2013.01)
USPC ................ 726/6; 726/2; 726/3; 726/4; 726/5; 713/182; 713/183; 713/184

(58) Field of Classification Search
None
See application file for complete search history.

(56) References Cited

U.S. PATENT DOCUMENTS

| 6,643,784 | B1 | 11/2003 | McCulligh | |
|---|---|---|---|---|
| 7,036,016 | B1 * | 4/2006 | Smith, Jr. | 713/185 |
| 2004/0168068 | A1 | 8/2004 | Goal et al. | |
| 2005/0160297 | A1 * | 7/2005 | Ogawa | 713/202 |
| 2006/0031174 | A1 * | 2/2006 | Steinmetz | 705/67 |
| 2006/0156385 | A1 * | 7/2006 | Chiviendacz et al. | 726/2 |
| 2007/0226784 | A1 * | 9/2007 | Ueda et al. | 726/5 |
| 2008/0098464 | A1 * | 4/2008 | Mizrah | 726/5 |
| 2008/0244700 | A1 * | 10/2008 | Osborn et al. | 726/2 |

FOREIGN PATENT DOCUMENTS

| JP | 06-052112 | 2/1994 |
|---|---|---|
| WO | WO 2006081593 | 8/2006 |

* cited by examiner

*Primary Examiner* — Kaveh Abrishamkar
*Assistant Examiner* — Adrian Stoica
(74) *Attorney, Agent, or Firm* — The Farrell Law Firm, P.C.

(57) ABSTRACT

A method and apparatus for generating a password in real time by creating at least one password map during creation of an account associated with a user, and generating and providing a random password hint sequence grid to the user in real time, authenticating the user for accessing the account using a password created by the user, where the password is created by the user using the random password hint sequence grid and the at least one password map.

15 Claims, 7 Drawing Sheets

REAL TIME PASSWORD GENERATION APPARATUS AND METHOD

PRIORITY

This application claims priority under 35 U.S.C. §119(a) to an Indian Patent Application filed in the Indian Patent Office on Jan. 27, 2011 and assigned Serial No. IN 252/CHE/2011, the entire disclosure of which is incorporated herein by reference.

BACKGROUND OF THE INVENTION

1. Field of the Invention

The present invention relates generally to user authentication, and more particularly to a password generation apparatus and method.

2. Description of the Related Art

Many secure access techniques are known to gain access to secure computer systems, bank accounts, and other processes within a computer or Internet device. For example, communication units include web browsers that may be used to gain access to web-based information from a web server and may be coupled via a wireless or non-wireless communication link. Techniques are known to provide session based authentication between, for example, a user device (i.e., such as a Personal Computer (PC), Internet device, laptop computer, smart card, radio telephone, or any other suitable device) and external system, such as a web service on the Internet, or to processes within the same device. Cryptographic engines are often used to provide public key-based encryption, decryption, digital signing and signature verification as known in the art, and in such systems public and private key pairs are periodically generated and a user is allowed to digitally sign information, or decrypt information using private keys.

Session-based single factor authentication techniques are known wherein, for example, a first unit, such as a user device, is queried by a server which may contain, for example, credit card accounts, bank accounts or any other secure information, for the user to enter a user identification (ID) and a password to send so that the server can trust the user device. However, such systems are vulnerable to attack. For example, an attacker that maliciously obtains a user password can thereafter impersonate that user. Two factor authentications add another level of security. For example, a server may return an authentication code, such as a random number generated by a random number generator in the server to the user device after the user entered the correct user ID and password. The user device receives and digitally signs the received authentication code using a private signature key located on a smartcard that has been inserted into a smartcard reader at the user device, and returns the digitally signed authentication code over a same channel that was used to originally send the generated authentication code. However, deployment of such schemes is limited by at least the monetary expense of supporting card readers at user devices.

Moreover, information security systems are being developed to allow a user to roam from one device to another. For example, a user profile that includes, for example, private keys such as private decryption keys and private signing keys along with user password information and other cryptographic keys, may be encrypted and stored in a server that is accessible by a user using a plurality of devices. The user profile is then sent to a user but only after an authentication procedure is carried out. Such authentication procedures may typically involve a user using a web browser through which a user ID and password is entered. However, no other user-specific credentials are typically necessary. As a result, an unscrupulous party may gain access to a user's private keys if they are able to obtain a user ID and password through observing a user, key logging, and screen capturing and the like, while the user is entering the information on a keyboard.

SUMMARY OF THE INVENTION

Accordingly, the present invention has been made to solve the above-stated problems occurring in the prior art, and the present invention provides a method and apparatus for generating a password in real-time.

According to an aspect of the present invention, there is provided a method for generating a password in real-time by creating at least one password map during creation of an account associated with a user, and generating and providing a random password hint sequence grid to the user in real time. The method includes authenticating the user for accessing the account using a password created by the user, where the password is created by the user using the random password hint sequence grid and the at least one password map.

According to another aspect of the present invention, there is provided a non-transitory computer-readable storage medium having stored thereon instructions for generating a password in real time, comprising a first code segment, for creating at least one password map during creation of an account associated with a user, a second code segment, for generating and providing a random password hint sequence grid to the user in real time, and a third code segment, for authenticating the user for accessing the account using a password created by the user, wherein the password is created by the user using the random password hint sequence grid and the at least one password map.

According to yet another aspect of the present invention, there is provided an apparatus, which includes a processor, and memory coupled to the processor. The memory includes a password generation module for creating at least one password map during creation of an account associated with a user, and for generating and providing a random password hint sequence grid to the user in real time. The password generation module authenticates the user for accessing the account using a password created by the user, where the password is created by the user using the random password hint sequence grid and the at least one password map.

BRIEF DESCRIPTION OF THE DRAWINGS

The above and other aspects, features and advantages of the present invention will be more apparent from the following description taken in conjunction with the accompanying drawings, in which.

DETAILED DESCRIPTION OF EMBODIMENTS OF THE PRESENT INVENTION

Embodiments of the present invention will be described in detail with reference to the accompanying drawings. In the following description, specific details such as detailed configuration and components are merely provided to assist in the overall understanding of the embodiments of the present invention. Therefore, it should be apparent to those of ordinary skill in the art that various changes and modifications of the embodiments described herein can be made without departing from the scope and spirit of the invention. In addition, descriptions of well-known functions and constructions are omitted for clarity and conciseness.

Figure 1A:
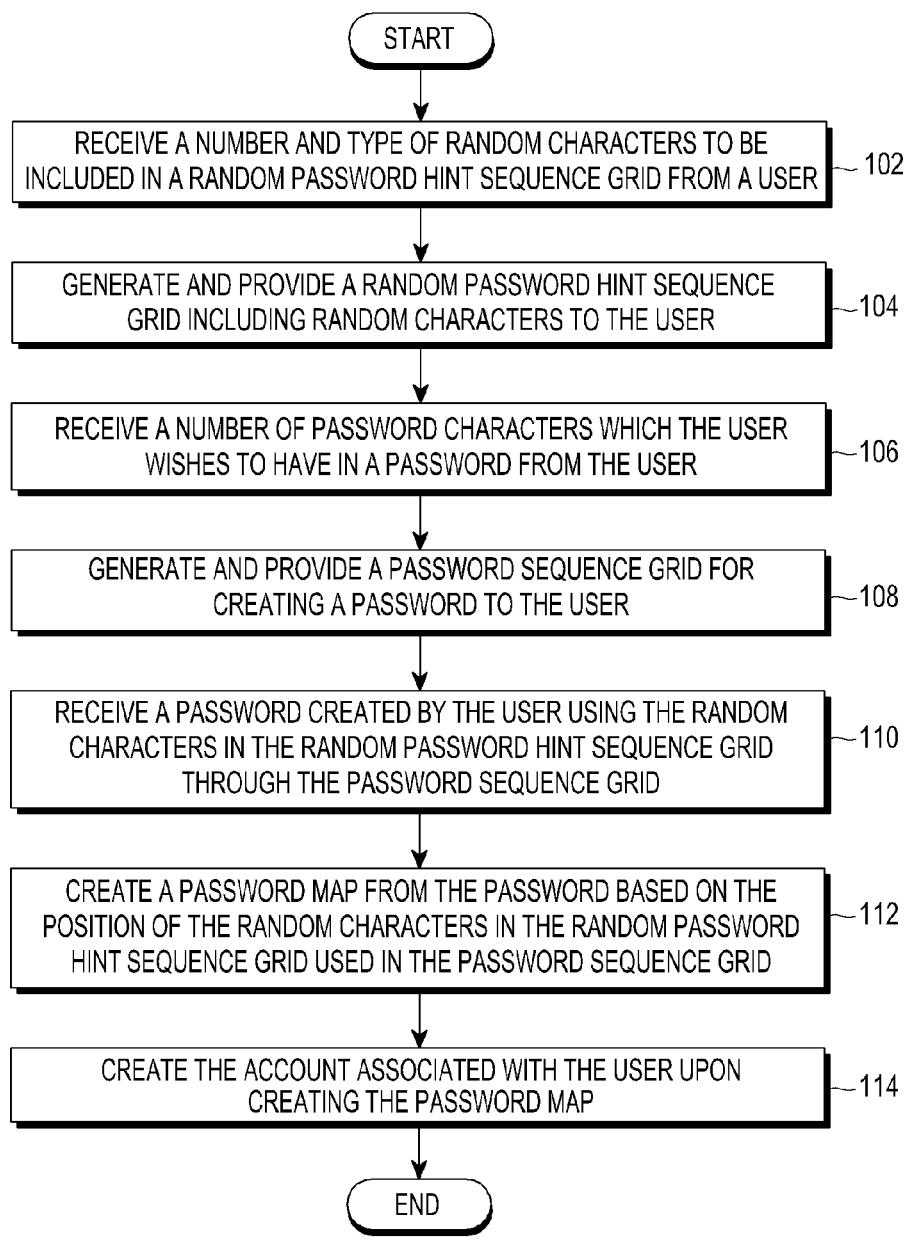
FIG. 1A is a diagram illustrating a process flow chart of a method of creating a password map during creation of an account for a user, according to an embodiment of the present invention.

FIG. 1A is a diagram illustrating a process flow of a method for creating a password map during the creation of an account for a user, according to an embodiment of the present invention. At step 102, a number and type of random characters to be included in a random password hint sequence gird is received from the user. The type of random characters may include case sensitive characters, case insensitive characters, numeric characters, alphanumeric characters, numeric alphabet characters, picture-numeric characters, and picture-alphabetic characters. At step 104, a random password hint sequence grid including random characters is generated and provided to the user. The number of random characters in the random password hint sequence grid may equal to the number input by the user in step 102.

At step 106, a number of password characters which the user wishes to have in a password is received from the user. At step 108, a password sequence grid for creating a password is generated and provided to the user. The password sequence grid includes as many fields as indicated by the number input by the user at step 106. At step 110, a password created by the user using the random characters in the random password hint sequence grid is received through the password sequence grid.

At step 112, a password map is created from the password received in the password sequence grid based on the position of the random characters in the random password hint sequence grid used in the password sequence grid. Further, the password map is stored for future authentication of passwords entered by the user based on the stored password map. It is understood that a new password map may also be created during recovery of exiting password map, when the user forgot/lost the exiting password map, reset of the existing password map, and change in the password map. At step 114, the account associated with the user is created upon creating and storing the password map.

Figure 1B:
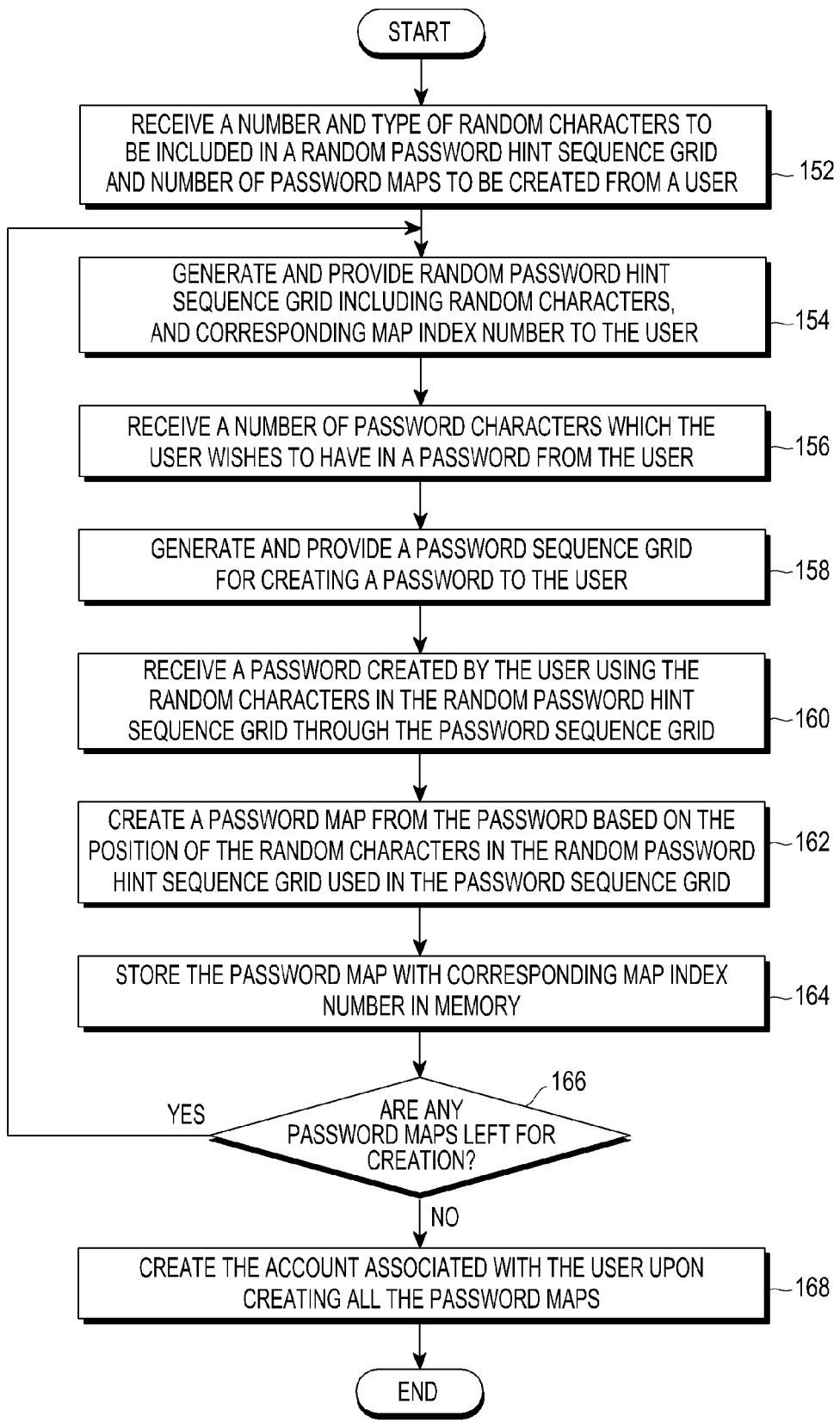
FIG. 1B is a diagram illustrating a process flow chart of a method of creating multiple password maps during creating an account for a user, according to an embodiment of the present invention.

FIG. 1B is a diagram illustrating a process flow chart of a method of creating multiple password maps during creating an account for a user, according to an embodiment of the present invention. At step 152, a number and type of random characters to be included in a random password hint sequence gird and a number of password maps to be created is received from the user. The type of random characters may include case sensitive characters, case insensitive characters, numeric characters, alphanumeric characters, numeric alphabet characters, picture-numeric characters, and picture-alphabetic characters. At step 154, a random password hint sequence grid including random characters and a corresponding map index number is generated and provided to the user. The number of random characters in the random password hint sequence grid may equal the number input by user in step 152.

At step 156, a number of password characters which the user wishes to have in a password is received from the user. At step 158, a password sequence grid for creating a password is generated and provided to the user. The password sequence grid includes as many fields as indicated by the number input by the user at step 156. At step 160, a password created by the user using the random characters in the random password hint sequence grid is received through the password sequence grid.

At step 162, a password map is created from the password received in the password sequence grid based on the position of the random characters in the random password hint sequence grid used in the password sequence grid. At step 164, the password map along with the corresponding map index number is stored for future authentication of passwords entered by the user based on the stored password map. It is understood that a new password map may also be created during recovery of exiting password map, when the user forgot/lost the exiting password map, reset of the existing password map, and change in the password map. At step 166, it is determined whether there is any password map left for creation. If so, the process is routed to step 154 and steps 154-166 are repeated till all the password maps are created. At step 168, the account associated with the user is created upon creating and storing all the password maps.

Figure 2:
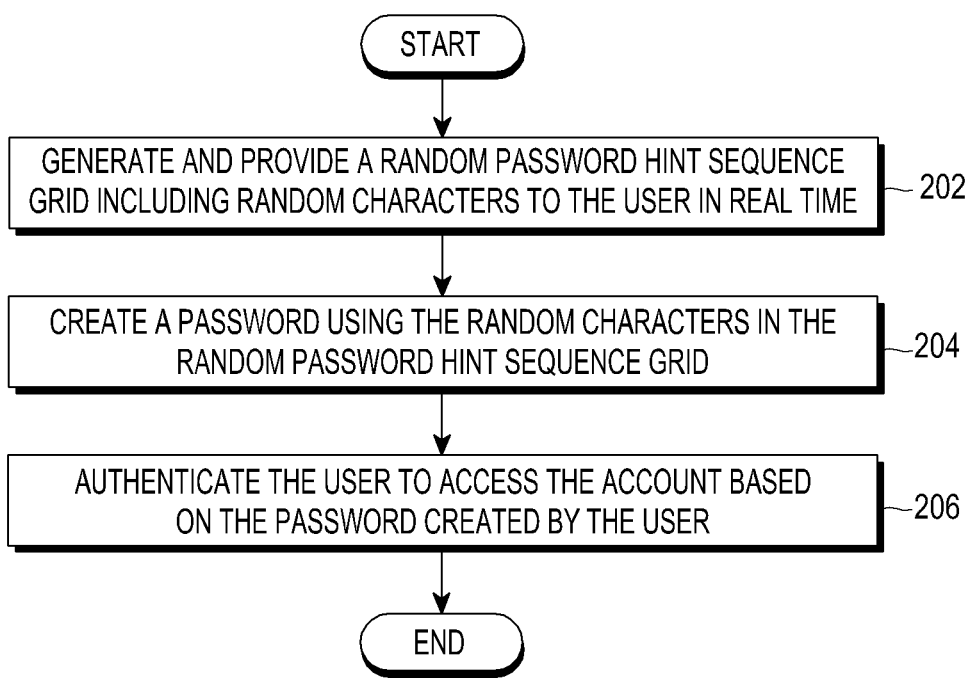
FIG. 2 is a diagram illustrating a process flow chart of a method of authenticating the user to access the account based on a password generated in real time, according to an embodiment of the present invention.

FIG. 2 is a diagram illustrating a process flow chart of a method of authenticating the user to access the account based on a password generated in real time, according to an embodiment of the present invention. When the user wishes to login into an account to access information or a system, the user may wish to enter the login credentials such as username and password. In such case, the password is generated in real time as described in the following steps. At step 202, a random password hint sequence grid including random characters is generated and provided to the user in real time. The number and type of random characters is as specified by user during account creation, as in FIG. 1. The type of random characters may include case sensitive characters, case insensitive characters, numeric characters, alphanumeric characters, numeric alphabet characters, picture-numeric characters, and picture-alphabetic characters.

At step 204, a password is created using the random characters in the random password hint sequence grid. The random characters in the random password hint sequence grid are selected for creating the password based on the password map formed during creation of the account. In case, multiple password maps are created during the account creation, then the random password hint sequence grid generated in real time includes a password map index location in one of its field indicating corresponding one of the multiple password maps. Accordingly, a new password is created using the random password hint sequence grid generated in real time based on the one of the password maps corresponding to the password map index location.

At step 206, the user is authenticated to access the account based on the password created by the user. The password entered by the user may be compared with a system generated password using the random password hint sequence grid and the corresponding password map. If the password matches the system generated password, then the user is authenticated to access the account. It is appreciated that the present invention uses security and encryption mechanisms well known to persons skilled in the art.

Figure 3A:
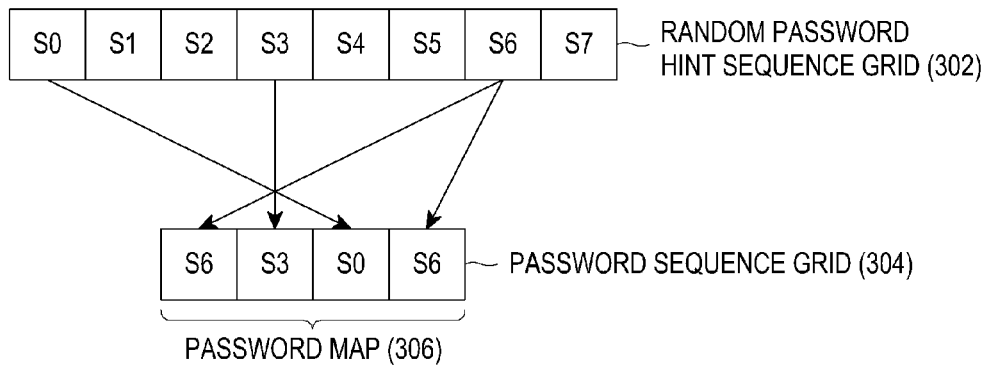
FIGS. 3A and 3B are diagrams illustrating generation of a password map and a password based on the password map, according to an embodiment of the present invention.
Figure 3B:
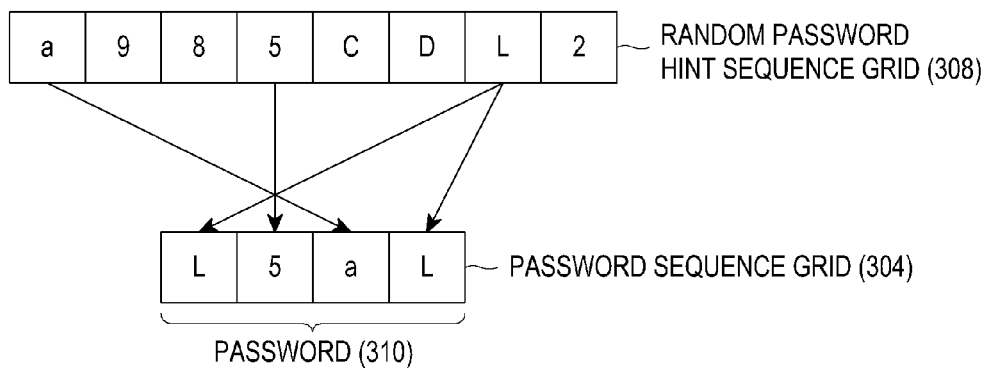

FIGS. 3A and 3B are schematic diagrams illustrating generation of a password map 306 and a password 310 based on the password map 306, according to an embodiment of the present invention. A user may enter a password application menu for creating an account, and the user is prompted to enter number of random characters which a random password hint sequence grid 308 should include when generated in real time. If the user enters a value "8," it indicates that the random password hint sequence grid 308 should include 8 random characters. Accordingly, a computing device (e.g., user device or a remotely located server connected to the user device via network) generates and provides a random password hint sequence grid 302 with index S0 to S7.

Then, the user is prompted to enter number of password character fields which a password sequence grid 304 should include. The user enters a value "4" which indicates that the password sequence grid 304 should include 4 fields and a password 310 is 4 characters long. Accordingly, the computing device generates and provides an empty password sequence grid 304 with four empty indexes for entering the random characters. The user fills the password sequence grid 304 using any four random characters from the random password hint sequence grid 302 to form a password. As a consequence, a password map 306 is created based on the random characters filled in the password hint sequence grid 304. The password map 306 represents field numbers associated the random characters in the random password hint sequence grid 306 used in the indexes of the password sequence grid 304 for forming the password map 306 during creation of the account. If the user uses random characters in indexes S6, S0, S3, S6 in a sequential order in the password sequence grid 304, the order S6, S0, S3, and S6 forms a password map 306 as illustrated in FIG. 3A.

When the user wishes to get authenticated by the computing device, the computing device provides a random password hint sequence grid 308 generated in real time to the user. The user fills empty fields in a password sequence grid 304 using random characters in the random password hint sequence grid 308 based on the password map 306 formed in FIG. 3A. For example, as shown in FIG. 3B, the random password hint sequence grid 308 includes random characters S0=a, S1=9, S2=8, S3=5, S4=C, S5=D, S6=L, and S7=2. Therefore, the password 310 formed using characters in the random password hint sequence grid 308 corresponding to the password map 306 (S6 S0 S3 S6) is "L5aL."

FIGS. 4A through 4E are schematic diagrams illustrating generation of multiple password maps 406-412 and a password 416 based on one of the multiple password maps 406-412, according to an embodiment of the present invention. A user may enter a password application menu for creating an account, and the user is prompted to enter the number of password maps 406-412 the user wishes to create. Further, the user is prompted to enter number of random characters which a random password hint sequence grid 414 should include when generated in real time. If the user enters a value "4," it indicates that the random password hint sequence grid 414 should include 4 random characters. Accordingly, for forming each password map, a computing device (e.g., user device or a remotely located server connected to the user device via network) generates and provides a random password hint sequence grid 402 with index S0 to S3 and a password map number Mx.

Figure 4A:
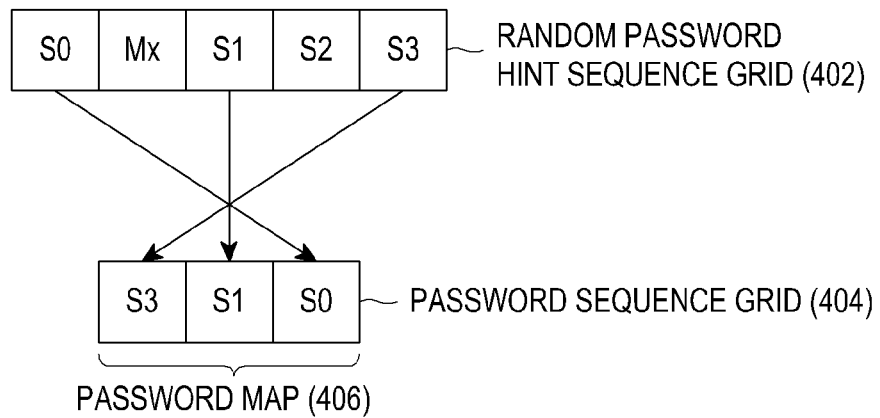
FIGS. 4A-4E are diagrams illustrating generation of multiple password maps and a password based on one of the multiple password maps, according to an embodiment of the present invention.
Figure 4B:
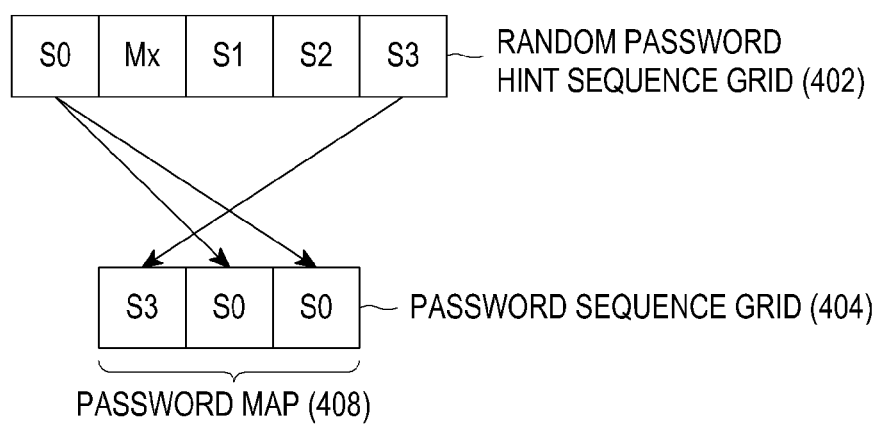
Figure 4C:
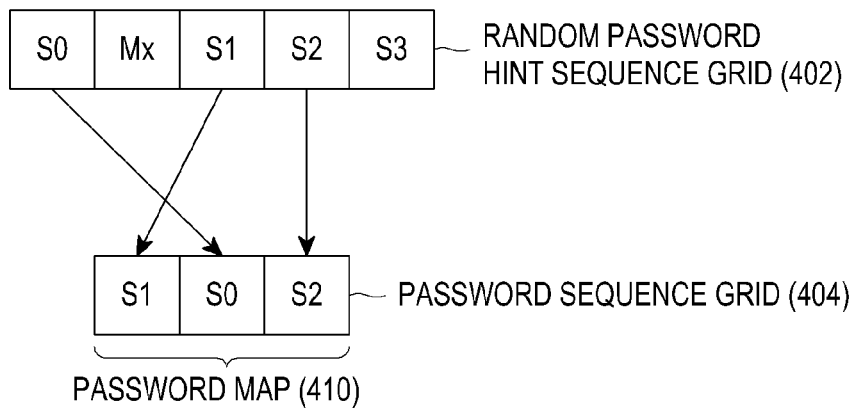
Figure 4D:
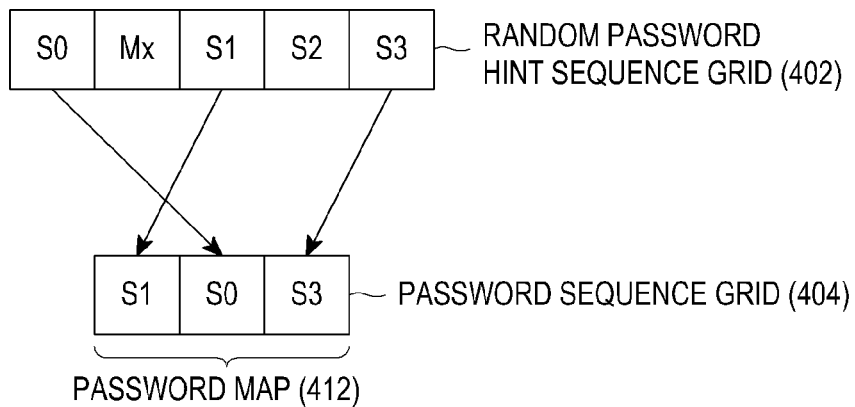

Then, the user is prompted to enter number of password character fields which a password sequence grid 404 should include. The user enters a value "3" which indicates that the password sequence grid 404 should include 3 fields and a password is 3 characters long. It is noted that, the length of the password sequence grid 404 is less than the length of the random password hint sequence grid 404. Accordingly, the computing device generates and provides an empty password sequence grid 404 with three empty indexes for entering the password. The user thus fills the password sequence grid 404 using any three random characters from the random password hint sequence grid 402. Consequently, a password map 406 is created based on the random characters filled in the password hint sequence grid 404. The password map 406 represents field numbers associated the random characters in the random password hint sequence grid 402 used in the indexes of the password sequence grid 404 during creation of the account. If the user uses random characters in indexes S3, S1, and S0 in a sequential order in the password sequence grid 404, the order S3, S1, S0 forms a first password map 406 as illustrated in FIG. 4A. Similarly, the second, third and fourth password maps 408-412 are formed in manner described above and as shown in FIGS. 4B through 4C.

Figure 4E:
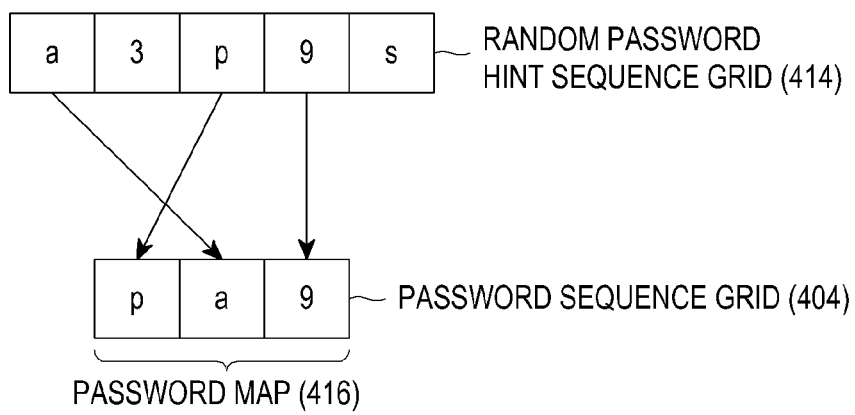

Further, when the user wishes to get authenticated by the computing device, the computing device provides a random password hint sequence grid 414 generated in real time to the user. The user fills empty fields in the password sequence grid 404 using random characters in the random password hint sequence grid 414 based on corresponding one of the four password maps 406-412 formed in FIGS. 4A through 4D. The random password hint sequence grid 414 includes a value (Mx) which indicates a password map of the four password maps 406-412 to be used for generating a password 416. In the value Mx, M indicates a password map and x indicates a password map index number. Based on the value Mx, the password 416 is created using the random characters in the random password hint sequence grid 414 and one of the password maps 406-412 corresponding to the value in the random password hint sequence grid 414. For example, as shown in FIG. 4E, the random password hint sequence grid 416 includes random characters S0=a, S1=p, S2=9, S3=s and a password map number Mx=3. Therefore, the password 416 formed using random characters in the random password hint sequence grid 414 corresponding to the third password map 410 (S1 S0 S2) is "Pa9."

Figure 5:
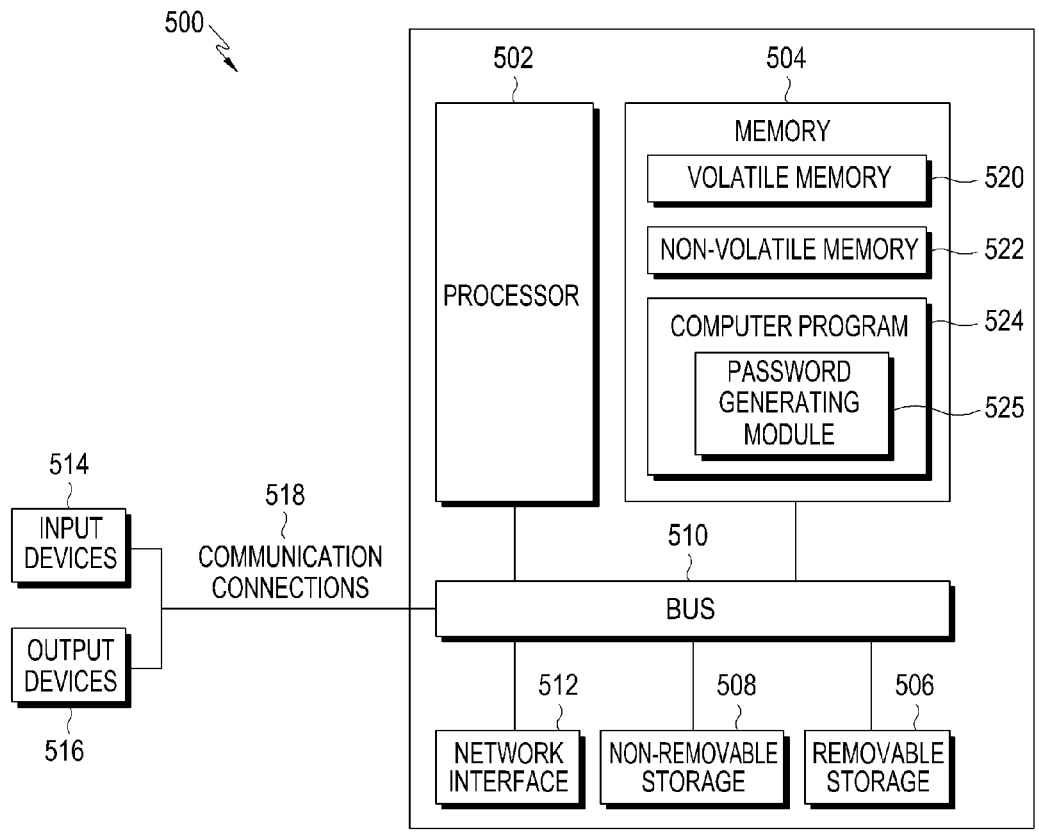
FIG. 5 is a diagram illustrating an example of a suitable computing device for implementing an embodiment of the present invention.

FIG. 5 is a diagram illustrating an example of a suitable computing device 500 for implementing an embodiment of the present invention. FIG. 5 and the following discussion are intended to provide a brief, general description of the suitable computing device 500 in which the embodiments of the present invention may be implemented.

The computing device 500 includes the processor 502, the memory 504, a removable storage 506, and a non-removable storage 508. The computing device 500 additionally includes a bus 510 and a network interface 512. The computing device 500 includes or accesses one or more user input devices 514, one or more output devices 516, and one or more communication connections 518 such as a Network Interface Card (NIC) or a Universal Serial Bus (USB) connection. The one or more user input devices 514 may be a keyboard, a mouse, and the like. The one or more output devices 516 may be a display and other output devices. The communication connections 518 may include a Local Area Network (LAN), a Wide Area Network (WAN), a General Packet Radio Service (GPRS) and so on.

The memory 504 may include a volatile memory 520 and a non-volatile memory 522. A variety of computer-readable storage media may be stored in and accessed from the memory elements of the computing device 500, such as the volatile memory 520 and the non-volatile memory 522, the removable storage 506 and the non-removable storage 508. Computer memory elements may include any suitable memory device(s) for storing data and machine-readable instructions, such as Read Only Memory (ROM), Random Access Memory (RAM), Erasable Programmable Read Only Memory (EPROM), Electrically Erasable Programmable Read Only Memory (EEPROM), Hard Disk Drive (HDD), removable media drive for handling Compact Disks (CDs), Digital Video Disks (DVDs), diskettes, magnetic tape cartridges, memory cards, Memory Sticks™, and the like.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, smart cards, and the like.

Embodiments of the present invention may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 502 of the computing device 500. For example, a computer program 524 may include a password generation module 525 in the form of machine-readable instructions capable of generating a password in real time, according to the teachings and herein described embodiments of the present invention. The machine-readable instructions may cause the computing device 500 to encode according to the various embodiments of the present invention.

For example, the password generation module 525 creates at least one password map during creation of an account associated with a user. The password generation module 525 generates and provides a random password hint sequence grid to the user in real time. The password generation module 525 authenticates the user for accessing the account using a password created by the user, where the password is created by the user using the random password hint sequence grid and the at least one password map.

Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present invention has been shown and described in detail with reference to embodiments thereof, it will be evident to those of ordinary skill in the art that various modifications and changes in form and detail may be made therein without departing from the spirit and scope of the present invention as defined by the appended claims.

What is claimed is:

1. A method for generating a password in real time in a processor, the method comprising:
creating a plurality of password maps during creation of an account associated with a user;
generating and providing a random password hint sequence grid to the user in real time; and
authenticating the user for accessing the account using a password created by the user, wherein the password is created by the user using random characters in the random password hint sequence grid and one of the plurality of password maps, wherein the random password hint sequence grid includes a password map number that identifies the one of the plurality of password maps.

2. The method of claim 1, wherein the random password hint sequence grid includes a plurality of random characters generated in real time, and wherein the plurality of characters are selected from the group consisting of case sensitive characters, case insensitive characters, numeric characters, alpha numeric characters, numeric alphabet characters, picture-numeric characters, and picture-alphabetic characters.

3. The method of claim 2, wherein the password is created using the plurality of random characters in the random password hint sequence grid generated in real time.

4. The method of claim 1, wherein creating the plurality of password maps during creation of the account associated with the user comprises:
receiving a first input from the user;
generating and providing at least one random password hint sequence grid to the user based on the first input received from the user, wherein the first input indicates a number of random characters in the at least one random password hint sequence grid;
receiving a second input from the user;
generating and providing the password sequence grid to the user for creating a password based on the second input received from the user, wherein the second input indicates a number of characters associated with the password;
receiving the password created by the user using the random characters in the at least one random password hint sequence grid through the password sequence grid;
creating at least one password map from the password received in the password sequence grid based on the position of the random characters in the at least one random password hint sequence grid used in the password; and
creating the account associated with the user upon creating the at least one password map.

5. The method of claim 1, wherein generating and providing the random password hint sequence grid to the user in real time comprises:
generating the random password hint sequence grid including random characters, wherein a number of random characters in the random password hint sequence grid is based on the first input; and
providing the random password hint sequence grid including the random characters to the user such that the password is created by the user using the random characters in the random password hint sequence grid generated in real time and one of the plurality of password maps created during creation of the account.

6. A non-transitory computer-readable storage medium having stored thereon instructions for generating a password in real time in a processor, the medium comprising:
a first code segment, for creating a plurality of password maps during creation of an account associated with a user;
a second code segment, for generating and providing a random password hint sequence grid to the user in real time; and a third code segment, for authenticating the user for accessing the account using a password created by the user, wherein the password is created by the user using random characters in the random password hint sequence grid and one of the plurality of password map, wherein the random password hint sequence grid includes a password map number that identifies the one of the plurality of password maps.

7. The storage medium of claim 6, wherein the random password hint sequence grid includes a plurality of random characters generated in real time, and wherein the plurality of characters are selected from the group consisting of case sensitive characters, case insensitive characters, numeric characters, alpha numeric characters, numeric alphabet characters, picture-numeric characters, and picture-alphabetic characters.

8. The storage medium of claim 7, wherein the password is created using the plurality of random characters in the random password hint sequence grid generated in real time.

9. The storage medium of claim 6, wherein creating the plurality of password maps during creation of the account associated with the user comprises:

receiving a first input from the user, generating and providing at least one random password hint sequence grid to the user based on the first input received from the user, wherein the first input indicates a number of random characters in the at least one random password hint sequence grid;

receiving a second input from the user, generating and providing the password sequence grid to the user for creating the password based on the second input received from the user, wherein the second input indicates a number of characters associated with the password;

receiving the password created by the user using the random characters in the at least one random password hint sequence grid through the password sequence grid;

creating at least one password map from the password received in the password sequence grid based on the position of the random characters in the at least one random password hint sequence grid used in the password; and creating the account associated with the user upon creating the at least one password map.

10. The storage medium of claim 9, wherein generating and providing the random password hint sequence grid to the user in real time comprises:

generating the random password hint sequence grid including random characters, wherein a number of random characters in the random password hint sequence grid is based on the first input, and providing the random password hint sequence grid including the random characters to the user such that the password is created by the user using the random characters in the random password hint sequence grid generated in real time and one of the plurality of password maps created during creation of the account.

11. An apparatus for generating a password in real time in a processor, the apparatus comprising:

the processor; and a memory, coupled to the processor, wherein the memory includes a password generation module for creating a plurality of password maps during creation of an account associated with a user, generating and providing a random password hint sequence grid to the user in real time, and authenticating the user for accessing the account using a password created by the user, wherein the password is created by the user using random characters in the random password hint sequence grid and one of the plurality of password maps, wherein the random password hint sequence grid includes a password map number that identifies the one of the plurality of password maps.

12. The apparatus of claim 11, wherein the random password hint sequence grid includes a plurality of random characters generated in real time, and wherein the plurality of characters are selected from the group consisting of case sensitive characters, case insensitive characters, numeric characters, alpha numeric characters, numeric alphabet characters, picture-numeric characters, and picture-alphabetic characters.

13. The apparatus of claim 12, wherein the password generation module enables creation of the password using the plurality of random characters in the random password hint sequence grid generated in real time.

14. The apparatus of claim 11, wherein in creating the plurality of password maps during creation of the account associated with the user, the password generation module is configured for:

receiving a first input from the user generating and providing the at least one random password hint sequence grid to the user based on the first input received from the user, wherein the first input indicates a number of random characters in the at least one random password hint sequence grid;

receiving a second input from the user;

generating and providing the password sequence grid to the user for creating a password based on the second input received from the user, wherein the second input indicates a number of characters associated with the password;

receiving the password created by the user using the random characters in the at least one random password hint sequence grid through the password sequence grid;

creating at least one password map from the password received in the password sequence grid based on the position of the random characters in the at least one random password hint sequence grid used in the password; and creating the account associated with the user upon creating the at least one password map.

15. The apparatus of claim 14, wherein in generating and providing the random password hint sequence grid to the user in real time, the password generation module is further configured for:

generating the random password hint sequence grid including random characters, wherein a number of random characters in the random password hint sequence grid is based on the first input, and providing the random password hint sequence grid including the random characters to the user such that the password is created by the user using the random characters in the random password hint sequence grid generated in real time and one of the plurality of password maps created during creation of the account.

* * * * *